Figure 1:
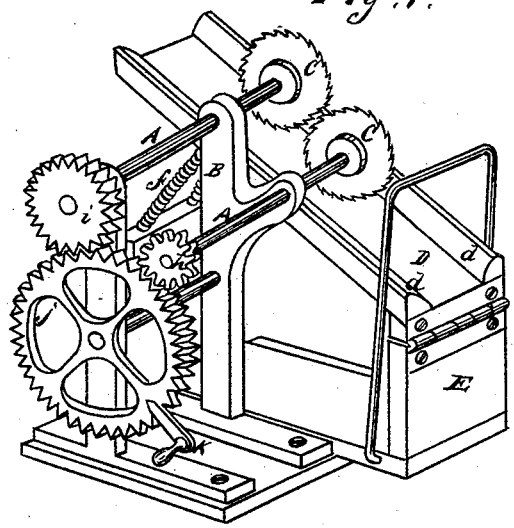
Figure 2:
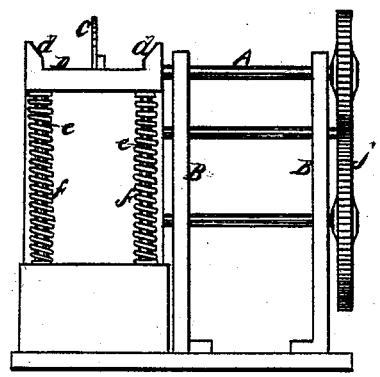

P. J. ISBELL.
Peach and Plum Cutting Machines.

No. 152,038. Patented June 16, 1874.

Witnesses
John L. Boone
C. M. Richardson

Inventor
Philo. J. Isbell
by Dewey & Co
Attys

UNITED STATES PATENT OFFICE.

PHILO J. ISBELL, OF PLACERVILLE, CALIFORNIA.

IMPROVEMENT IN PEACH AND PLUM CUTTING MACHINES.

Specification forming part of Letters Patent No. 152,038, dated June 16, 1874; application filed February 23, 1874.

*To all whom it may concern:*

Be it known that I, PHILO J. ISBELL, of Placerville, El Dorado county, State of California, have invented a Peach and Plum Cutting Machine; and I do hereby declare the following description and accompanying drawings are sufficient to enable any person skilled in the art or science to which it most nearly appertains to make and use my said invention without further invention or experiment.

My invention relates to a machine for cutting peaches, plums, and like fruit from which it is desired to remove the pits or stones; and it consists of one or more saws so arranged that the fruit can be passed under them while they are in motion, and thus be cut in two pieces, so that the pits or stones can be readily removed.

Referring to the accompanying drawings, A A are two horizontal shafts, which are arranged to turn in boxes on the upper end of standards B. On one end of each of these shafts I secure a saw or rotary knife, C, so that one saw or knife will be either directly in front of the other or slightly overlapping, as desired. When I use two saws, I prefer to place one lower down than the other, as represented in the drawing. D is an inclined chute, which I arrange below the knives or saws, which is placed at the proper angle to be equidistant from the lower edge of each saw or knife. This chute has beveled sides $d\ d$, and is just wide enough to allow an ordinary-sized peach to move down it. The lower end of this chute is hinged or otherwise loosely attached to the board E, upon which it rests, while the upper end is supported upon spiral or other springs $f\ f$, so that it can be depressed by any force exerted upon it below the knives. Rods $e\ e$ pass through the springs $f\ f$ and bottom of the chute, in order to steady it. The board E can be one side of a box, if desired, into which the cut fruit will fall after passing down the incline and under the knives or saws.

In operation, a rotary motion will be given to the saws C C by gear-wheels $h\ i\ j$ and crank K, or other suitable means, and the peaches, plums, or other fruit will be fed upon the upper end of the incline chute, either by hand or from a hopper. As the peaches or plums fall upon the upper end of the chute they roll singly down the incline under the saws, and are cut as they pass below them, so as to expose the pits or stones. After passing the saws the cut fruit falls into the box or other receptacle at the foot of the chute.

When only one saw is used, the peach or plum will not cut quite around it. I therefore generally use two saws, one in front of the other, so that the second saw cuts what the first one fails to cut, and takes out a great many pits that the first saw loosens and leaves in.

The springs under the incline chute serve to keep the plums close up against the knives or saws, and as the pits are oval the teeth of the saw take hold of them, so that when the fruit comes out from under the saw the pit is generally removed.

I do not claim that this machine will remove every stone from the fruit; but if the peaches or plums are free-stones, some of the pits will be removed by the saws, while those that remain are easily taken out by hand when putting the fruit out to dry. If the fruit is what is known as cling-stones, it is dried with the pits in.

Having thus described my invention, what I claim, and desire to secure by Letters Patent, is—

One or more rotary saws or knives, C C, in combination with the yielding inclined hinged chute D and springs $f\ f$, substantially as and for the purpose above described.

In witness whereof I hereunto set my hand and seal.

PHILO JUDSON ISBELL. [L. S.]

Witnesses:
R. O. TURNBULL,
E. W. WITMER.